H. B. Sinks,

Alcohol Still.

No. 101,388.  Patented Mar. 29. 1870.

Knight Bros.
Attys. for Sinks.

ATTEST.
Jas. H. Layman.
F. J. Reeves.

United States Patent Office.

HENRY B. SINKS, OF CINCINNATI, OHIO.

Letters Patent No. 101,388, dated March 29, 1870.

IMPROVEMENT IN DISTILLATION.

The Schedule referred to in these Letters Patent and making part of the same

I, HENRY B. SINKS, of Cincinnati, Hamilton county, Ohio, have invented a new and useful Improvement in Distillation, of which the following is a specification.

Nature and Objects of the Invention.

My invention relates to a means of reducing high proof whisky or spirit by the injection of cold water into the vapor-pipe or goose-neck, so as to cause the water to mingle intimately with the alcohol while the latter is in a partially heated and vaporous condition, thus effecting a more thorough blending of the alcoholic and aqueous particles, insuring perfect condensation of the former even with a comparatively short worm or flake-stand, and avoiding the serious waste of spirit by evaporation which accompanies the customary reduction by hot water after leaving the worm.

General Description with Reference to the Drawings.

Figure 1:
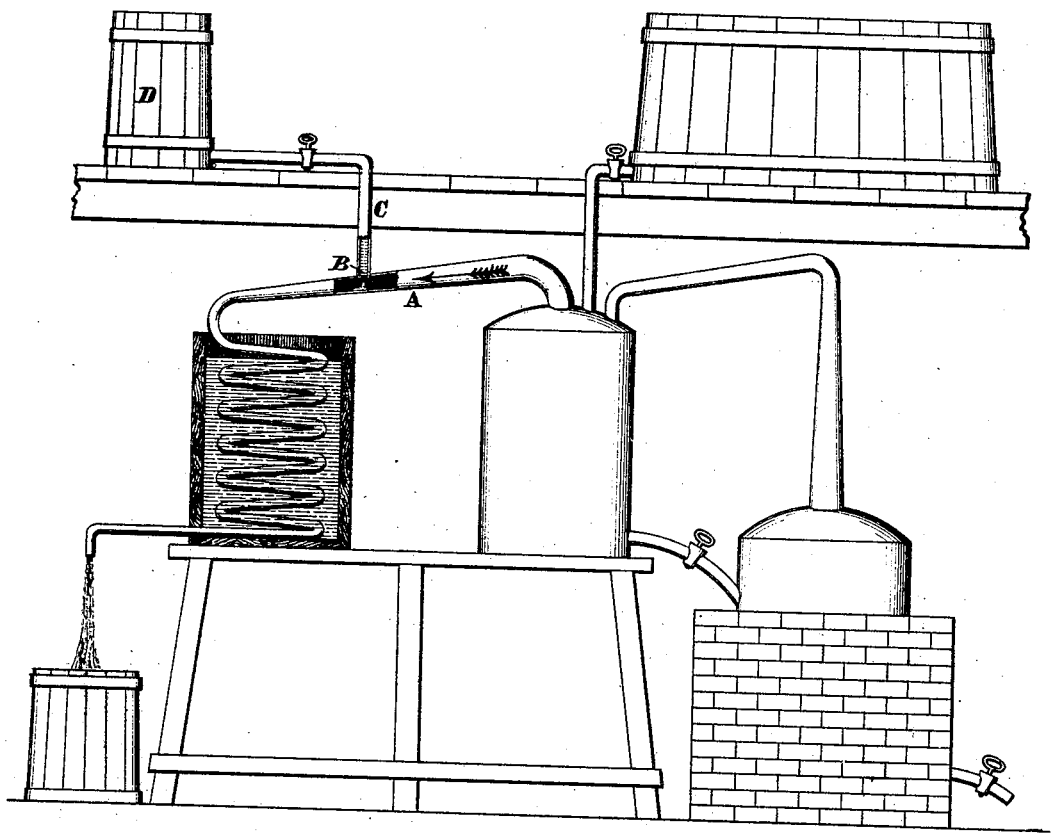
Figure 1 is a general view of a distilling-apparatus embodying my improvement.
Figures 2, 3:
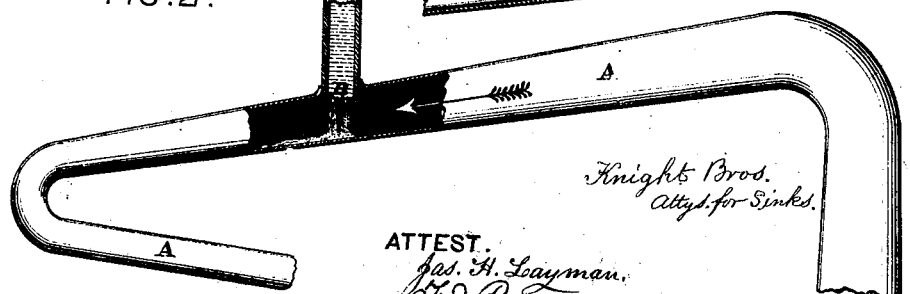
Figure 2 is an enlarged view of that portion to which my improvement is applied.
Figure 3 shows one form of my water-jet.

A represents the goose-neck or vapor-duct from the still.

B is a nozzle which conducts water into the goose-neck from a pipe, C, that communicates with an elevated tank, D, so as to impart sufficient pressure to the water to cause it to enter the goose-neck in the condition of spray.

In cities where water is introduced by hydrants or water-mains under considerable pressure, the elevated tank may be dispensed with, but where the water is turbid it should be made to traverse some filtering medium before entering the goose-neck.

My device is especially applicable for use in the second distillation of crude spirits or low wines.

I am aware that it has been proposed so to introduce steam, water, and other agents, as to mingle with the condensed vapor and low wines returning to the still or doubler, and, therefore, make no claim to such; but

I claim reducing the proof of alcohol *in transitu* from the still to the condenser, by means of a spray or jet of water in the goose-neck or vapor-pipe, so as to mingle and pass out with the condensed vapor of the worm or flake-stand.

In testimony of which invention I hereunto set my hand.

HENRY B. SINKS.

Witnesses:
   GEO. H. KNIGHT,
   JAMES H. LAYMAN.